(No Model.) 2 Sheets—Sheet 1.
J. E. ALDEN.
COMBINATION STEP LADDER, TABLE, AND PLATFORM.
No. 419,906. Patented Jan. 21, 1890.
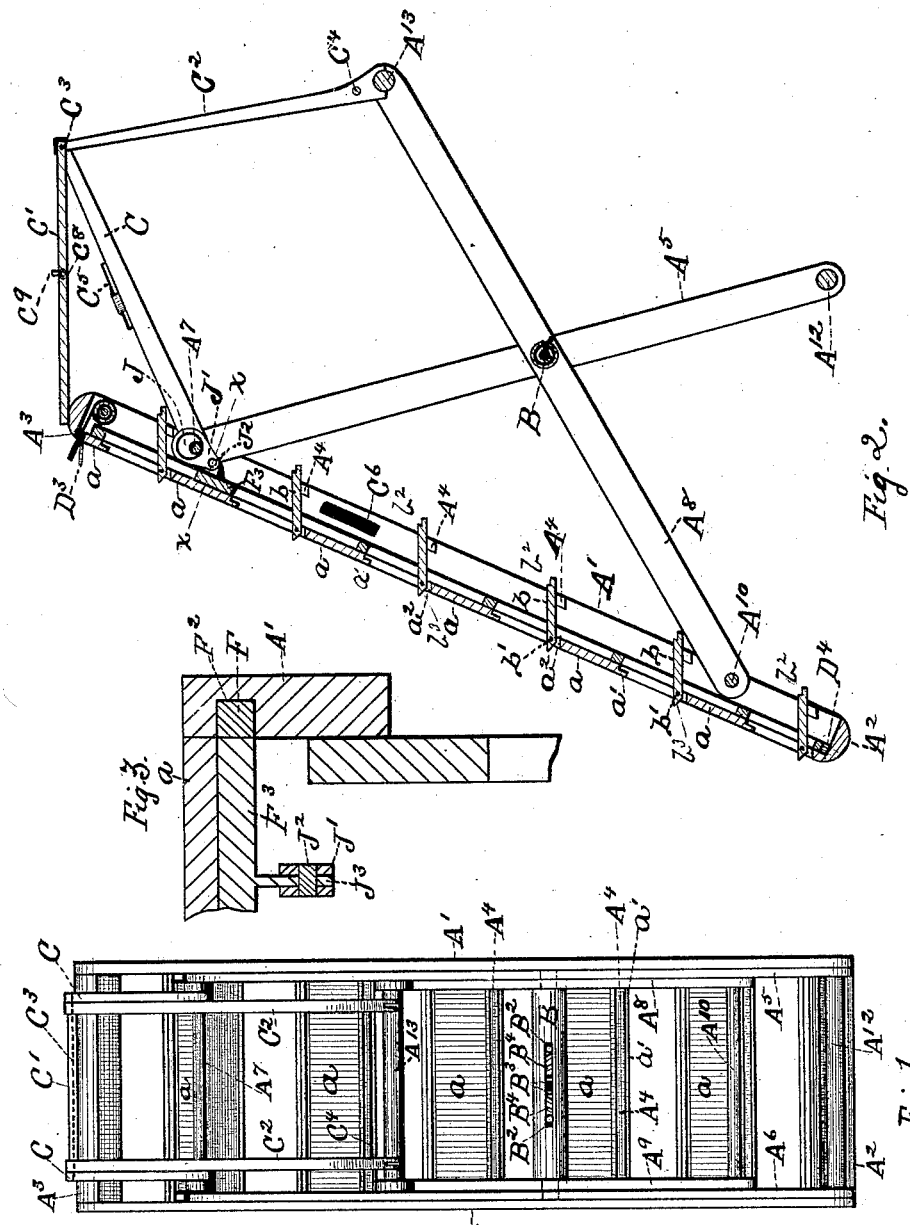
Witnesses:
Frank C. Curtis
John T. Booth
Inventor:
John E. Alden
by Geo. A. Mosher
Atty.

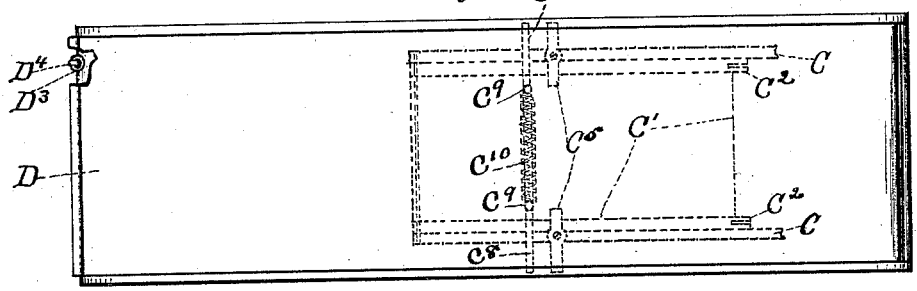
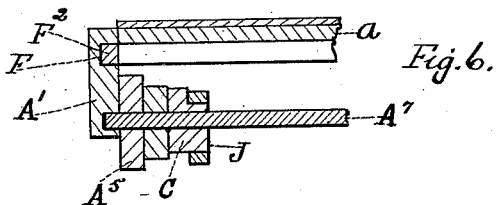
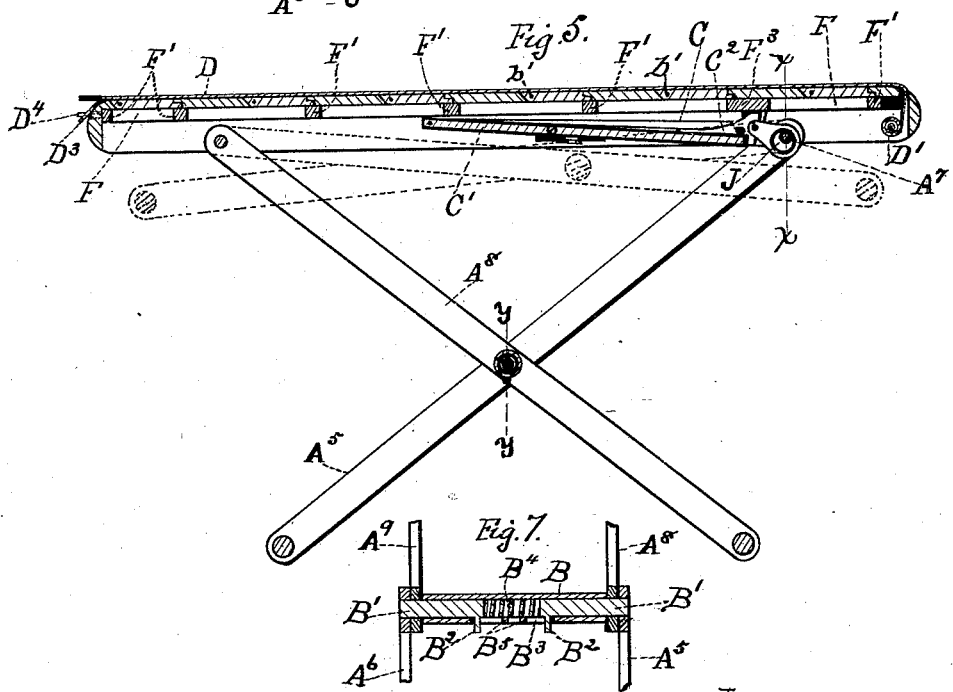
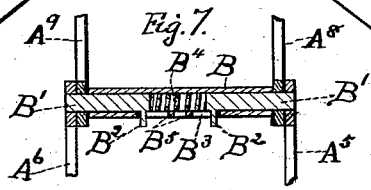

UNITED STATES PATENT OFFICE.

JOHN E. ALDEN, OF LAKE GEORGE, NEW YORK.

COMBINATION STEP-LADDER, TABLE, AND PLATFORM.

SPECIFICATION forming part of Letters Patent No. 419,906, dated January 21, 1890.

Application filed March 18, 1889. Serial No. 303,690. (No model.)

*To all whom it may concern:*

Be it known that I, JOHN E. ALDEN, a resident of Lake George, in the county of Warren and State of New York, have invented certain new and useful Improvements in Combination Step-Ladder, Table, and Platform; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in a combination step-ladder, platform, and table; and it consists of the novel construction and combination of parts hereinafter described, and pointed out in the claims.

Figure 1 of the drawings is a rear elevation of the device in the form of a step-ladder. Fig. 2 is a central vertical section of the device as shown in Fig. 1, and showing some of the parts in side elevation. Fig. 3 is a cross-section taken on the broken line $x\,x$ in Fig. 2. Fig. 4 is a top plan view of the device in the form of a table. Fig. 5 is a central longitudinal vertical section of the device as shown in Fig. 4, showing two of the supports in elevation. Fig. 6 is a vertical section of a portion of the table, taken on the broken line $x\,x$ in Fig. 5. Fig. 7 is a vertical section taken on the broken line $y\,y$ in Fig. 5.

The device is provided with a rectangular frame made up of the longitudinal side boards $A\,A'$, the end slats $A^2$ and $A^3$, and the intermediate cross-slats $a$, having one edge rabbeted, as shown at $a'$, and the other edge beveled, as shown at $a^2$. This frame maintains the same shape and form both as a ladder and a table. A series of cross-boards forming the steps $b$ are pivoted at each end near one edge, as at $b'$, to the side boards of the frame, the other edge being supported, when used as a step, by the cleats or projections $A^4$, secured to the side boards. The frame is also provided with the supports $A^5$ and $A^6$, pivoted upon the cross-rod $A^7$, supported by the side boards of the main frame, and the supports $A^8$ and $A^9$, pivoted upon the cross-rod $A^{10}$, supported by the side boards of the main frame. The supports $A^5$ and $A^6$ are connected at their oscillatory ends by the cross-rod $A^{12}$ and the supports $A^8$ and $A^9$ by the cross-rod $A^{13}$. The four supports, when arranged so that one pair crosses the other, as shown in Figs. 2 and 5, are made to serve as braces, each for the other, by means of a cross-rod consisting of the shell B, containing spring-actuated slide-rods B', projecting from each end of the shell and adapted to fit corresponding apertures in the several supports. The ends are each provided with operating arms or handles $B^2$, projecting out through slot $B^3$ in the shell, and are separated by a coil-spring $B^4$.

To secure the pairs of supports together it is only necessary to grasp the arms $B^2$ between the thumb and finger and force them toward each other until they strike the stops $B^5$ in the slot $B^3$. The inward slide movement given the rods will be sufficent to draw their outer ends within the rod-apertures in the supports $A^8$ and $A^9$ until the rod-apertures in both pairs are brought into alignment, so as to register with each other—the aperture in $A^6$ with that in $A^9$, the aperture in $A^5$ with that in $A^8$—whereupon the rods are released and forced by the spring into the position shown in Fig. 7. The stops $B^5$ serve to prevent the slide-rods from being withdrawn from their apertures in the supports $A^8$ and $A^9$, whereby the cross-rod is permanently secured in these supports. A pair of supporting-arms C are pivoted upon the cross-rod $A^7$. The oscillatory ends of such arms are pivoted upon and support one end of a platform $C'$, which platform may be a single board, (shown in end elevation in Fig. 1,) the other end being supported by the end slat $A^3$. The oscillatory braces $C^2$ are pivoted at one end upon the rod $C^3$, passing through the arms, braces, and platform, as shown in Fig. 2 and indicated by dotted line in Fig. 1. The oscillatory ends of the braces are connected by cross-rod $C^4$ and provided with notched or recessed ends adapted to receive and fit the cross-rod $A^{13}$ and be supported thereby, as shown in Fig. 2.

From the foregoing it will be readily understood how the device can be maintained in the position shown in Figs. 1 and 2 to support a person upon the ladder and permit of his easily ascending and descending the steps $b$; also, how the platform C' affords a convenient support for a pail, tools, or implements desired while using the ladder.

When it is desired to convert the ladder into a table such as shown in plan view in Fig. 4 and partly in section and partly in elevation in Fig. 5, it is only necessary to rest the main frame upon the floor with the supports projecting upward, swing the braces into alignment with the arms, drop the oscillatory ends of the arms, swing the platform into alignment with the braces and arms, and then swing the oscillatory ends of the arms, together with the braces and platform, in between the side boards of the main frame to the position shown in Fig. 5, where they can be secured by the buttons $C^5$, pivoted one upon each of the arms and adapted to be turned so that one end of each button will enter a slot $C^6$ in the side boards and support the arms, while the other end projects beneath one of the braces and one edge of the platform. (Shown partly by dotted lines in Fig. 4.) The device is then raised upon its supports to the position shown in Fig. 5 and the cover D drawn over the same from the spring-roller D', located at one end of the main frame, to the other end of the frame, and secured by rings $D^3$ upon the pins $D^4$, projecting from the cross-slats, a part of the cover being broken away in Fig. 4 to show a ring and pin. The spring-roller is not shown in detail, as it may be made like any well-known form of curtain spring-roller. The steps $b$, being pivoted at $b'$ and supported by the cleats $A^4$ in a position angular to the side boards, will all fall down upon the cross-slats $a$ when the frame is laid down, with the supports projecting upward to the position shown in Fig. 5, the rabbeted edges $b^2$ matching the rabbeted edges $a'$ and the beveled edges $b^3$ the beveled edges $a^2$ on the cross-slats $a$. They are secured in such position by a slide-frame of nearly the same length and width as the main frame and composed of side pieces F, connected by the cross-pieces F'. The side pieces are adapted to fit and slide in grooves cut in the side boards, as shown in Figs. 3 and 6. After the steps have been placed in the position shown in Fig. 5 the slide-frame is moved longitudinally of the frame from the position shown in Fig. 2 to that shown in Fig. 5, which brings a cross-piece F' directly under the oscillatory edge of each step, thereby firmly securing them in the desired position.

The slide-frame can be reciprocated by hand, either to secure the steps in the position shown in Fig. 5 or to release them from such position. I prefer, however, to accomplish the movement in another way, and have for that purpose provided each of the arms C with an eccentric hub or cam J on the cross-rod $A^7$, which cams are connected with the slide-frame by the cam-rods J', pivoted at $J^2$ upon lug $J^3$, projecting from the cross-piece $F^3$, which may be one of the pieces F' made a little wider. The oscillatory movement of the arms C in passing from the position shown in Fig. 2 to that shown in Fig. 5 serves to actuate the cams sufficiently to operate the slide-frame. The end piece on the left end of the slide-frame, as seen in Fig. 5, is provided with the pins $D^4$, fixed thereon to project through suitable apertures in the end slat of the main frame when the frames occupy the relative positions shown in Fig. 5, and hold the cover-rings $D^3$.

Should it be desired to convert the device from the table shown in Fig. 5 to the step-ladder shown in Figs. 1 and 2, it would only be necessary to turn the buttons $C^5$ to release the arms C, platform C', and braces $C^2$, and swing out the arms until the cams move the slide-frame back sufficiently to release the steps, as before explained, set the main frame on one end, and lift the oscillatory ends of the arms and platform to place, all as shown in Fig. 2. As soon as the slide-frame moves sufficiently to release the steps, it will at the same time withdraw the pins $D^3$ from the cover-rings, releasing the cover to the action of its spring-roller, which will immediately roll up the cover upon the roller.

When it is desired to store or transport the device, it can be folded to a very compact form by detaching one pair of supports from the other, as before explained, and folding the supports from the position shown by the solid lines in Fig. 5 to that shown by the dotted lines in the same figure.

Instead of employing the buttons $C^5$ to secure the platform C', arms C, and braces $C^2$ in a folded position, the spring-bolts $C^8$, having operating lugs or handles $C^9$, by which they may be operated against the force of the springs $C^{10}$, can be employed, the projecting ends of the bolts being forced into receiving-apertures in the side boards A A' of the main frame, which may be the apertures $C^6$ or separate apertures.

What I claim as new, and desire to secure by Letters Patent, is—

1. In a combination step-ladder and table, the combination, with a main rectangular frame provided with cross-slats fixed thereon, of a series of slats or steps pivoted upon the main frame and adapted to fit and be swung into and out of the spaces between the fixed slats, means for supporting the steps when swung into such spaces, as a slide-frame consisting of cross-pieces F', connected by the longitudinal slide-pieces F, and means for supporting the steps when swung out of such spaces, as cleats $A^4$, two pairs of supporting-legs, each fastened at one end to the main frame, projecting therefrom in angular converging planes, and crossing each other at points about midway of their lengths, and means for fastening such legs together at their points of crossing, as rods or pins B', substantially as described.

2. The combination, with a step-ladder having a pair of supporting-legs $A^5$ and $A^6$, of supports $A^8$ and $A^9$, secured to the ladder frame and legs and projecting beyond the latter, swinging arms C, braces $C^2$, and platform C', one end of the platform and braces being pivoted to the swinging ends of the arms, the other end of the braces being fitted to rest upon the projecting supports $A^8$ and $A^9$, substantially as described.

3. The combination, with the main frame of a combination step-ladder and table, of a table-cover having a plurality of retaining-rings, a spring-actuated cover-supporting roller secured to one end of the main frame, and a plurality of ring-engaging pins secured to a vibratory step-supporting frame and projecting through the cross-slat on the other end of the main frame, whereby the pins are withdrawn from the rings to release the cover by a vibratory movement of the slide-frame toward the roller end of the main frame, substantially as described.

4. In a combination step-ladder and table, the combination, with a main rectangular frame covered on one side by cross-slats, some of which are fixed thereon and others forming a regular equidistant series pivoted thereon at one edge, whereby the other edge can be swung out to form steps, of a slide-frame consisting of step-supporting cross-pieces F' and longitudinal pieces F, cam J, cam-rod J', pivoted upon one of the cross-pieces of the slide-frame, and the cam-actuating arm C, substantially as described.

5. The combination, in a table, with cross-supports $A^5$ $A^6$ $A^8$ $A^9$, of a support-binding cross-rod consisting of slotted shell B and shell-inclosing spring-actuated slide-rods B', having the handles $B^2$, substantially as described.

6. In a combination step-ladder and platform, the combination, with the boards of the ladder-frame provided with button-grooves, of a platform C', platform-supporting arms C, and brace $C^2$, pivoted together at one end, as at $C^3$, the other end of the arms being pivoted upon the ladder-boards and the buttons $C^5$ upon the arms, and means for supporting the braces $C^2$, consisting of the supports $A^8$ and $A^9$ and cross-rod $A^{13}$, substantially as described.

In testimony whereof I have hereunto set my hand this 28th day of February, 1889.

JOHN E. ALDEN.

Witnesses:
 GEO. A. MOSHER,
 CHARLES S. BRINTNALL.